United States Patent [19]
Hu

[11] Patent Number: 5,975,545
[45] Date of Patent: Nov. 2, 1999

[54] STRUCTURE OF WHEEL SEAT FOR A BABY STROLLER

[76] Inventor: Stephen Hu, No. 2, Ta-Tung Rd., Hsin-Chu Industrial Park, Taiwan

[21] Appl. No.: 09/053,914

[22] Filed: Apr. 1, 1998

[51] Int. Cl.[6] ..................................................... B60B 33/00
[52] U.S. Cl. ........................................ 280/47.38; 16/35 R
[58] Field of Search .................................. 280/647, 651, 280/657, 658, 47.34, 47.38; 16/18 R, 19, 45, 35 R, 37, 44, 38, 39, 31 R; 188/1.12

[56] References Cited

U.S. PATENT DOCUMENTS

| | | | |
|---|---|---|---|
| 4,453,787 | 6/1984 | Kassai | 16/35 R |
| 4,637,093 | 1/1987 | Kassai | 16/35 R |
| 4,649,506 | 3/1987 | Kassai | 16/35 R |
| 4,684,148 | 8/1987 | Glässer | 280/647 |
| 4,779,304 | 10/1988 | Kassai | 16/35 R |
| 4,805,250 | 2/1989 | Kassai | 16/35 R |
| 4,845,805 | 7/1989 | Kassai | 16/35 R |

*Primary Examiner*—Richard M. Camby

*Attorney, Agent, or Firm*—Pro-Techtor International Services

[57] ABSTRACT

A structure of a wheel seat for a baby stroller comprising an upper rotating seat with a first slide way, a lower rotating seat with a second slide way cooperating with the first slide way and including at least a longitudinal blocking member, a fixing pin provided on the upper rotating seat and extended through the lower rotating seat and having an engaging portion on the tailing end thereof for mutual rotatable engagement of the upper rotating seat with the lower rotating seat, a direction-fixing slide sleeve slidable in the first slide way and in the second slide way and being provided at least with an engaging slit for engaging the longitudinal blocking members of the lower rotating seat to restrain the upper rotating seat and the lower rotating seat from rotation and being provided with several arciform portions on the end having the engaging slit, and an activating member provided on the direction-fixing slide sleeve for making moving of the direction-fixing slide sleeve in the first and second slide ways. The wheel seat hence has an effect of automatic direction-fixing.

10 Claims, 6 Drawing Sheets

STRUCTURE OF WHEEL SEAT FOR A BABY STROLLER

BACKGROUND OF THE INVENTION

1. Field of the Invention

The present invention relates to the structure of a wheel seat for a baby stroller, and especially to such a structure by which progressing direction of the wheels of the baby stroller can be fixed, and in this fixed direction, the baby stroller can be operated conveniently.

2. Description of the Prior Art

A conventional wheel seat on a baby stroller can be rotated for 360 degrees in order that the wheels of the baby stroller can change direction conveniently. If it is to make the progressing direction of the baby stroller a linear one, practically, this is not so easy by the fact that the wheel seats are freely rotatable, the progressing direction of the wheels is subjected to deviation, i.e. the progressing direction of the baby stroller must be corrected at times.

SUMMARY OF THE INVENTION

The inventor of the present invention provides after hard study the structure of a wheel seat for a baby stroller of which the wheels can be correctly and fast fixed in progressing direction, i.e., the wheels of the baby stroller can have a function of fixing their progressing direction.

The primary object of the present invention is to provide the structure of a wheel seat for a baby stroller, the wheel seat can be fixed in progressing direction during operation, so that the wheels can run in a straight line.

Another object of the present invention is to provide the structure of a wheel seat for a baby stroller, the wheel seat can be correctly and fast fixed in progressing direction, so that fixing of direction in operation can be more convenient.

To obtain the above stated object, the structure of a wheel seat for a baby stroller of the present invention is characterized in comprising an upper rotating seat with a first slide way, a lower rotating seat with a second slide way which cooperates with the first slide way of the upper rotating seat and includes at least a longitudinal blocking member, a fixing pin provided on the upper rotating seat and extended through the lower rotating seat and having an engaging portion on the trailing end thereof for mutual rotatable engagement of the upper rotating seat with the lower rotating seat, a direction-fixing slide sleeve provided on the first slide way of the upper rotating seat and being slidable in the first slide way and further in the second slide way and being provided at least with an engaging slit for engaging the longitudinal blocking member of the lower rotating seat to restrain the upper rotating seat and the lower rotating seat from rotation as well as being provided with a plurality of arciform portions on the end having the engaging slit, and an activating member provided on the direction-fixing slide sleeve for making movement of the direction-fixing slide sleeve in the first and second slide ways.

By this structure, when it is to restrain the wheels of the baby stroller from rotation, the activating member is operated to engage the direction-fixing slide sleeve in the lower rotating seat to thereby engage the upper rotating seat with the lower rotating seat and restrain the wheel seats of the baby stroller from changing direction, that is, an effect of direction-fixing is obtained. Moreover, under guiding of the arciform portions provided on the direction-fixing slide sleeve, the engaging slit of the direction-fixing slide sleeve can accurately engage the blocking member on the lower rotating seat, thereby, an effect of correct and fast direction-fixing can be obtained.

The present invention will be apparent in its detailed technique and contents after reading the detailed description of the preferred embodiment thereof in reference to the accompanying drawings.

DETAILED DESCRIPTION OF THE PREFERRED EMBODIMENT

Figure 1:
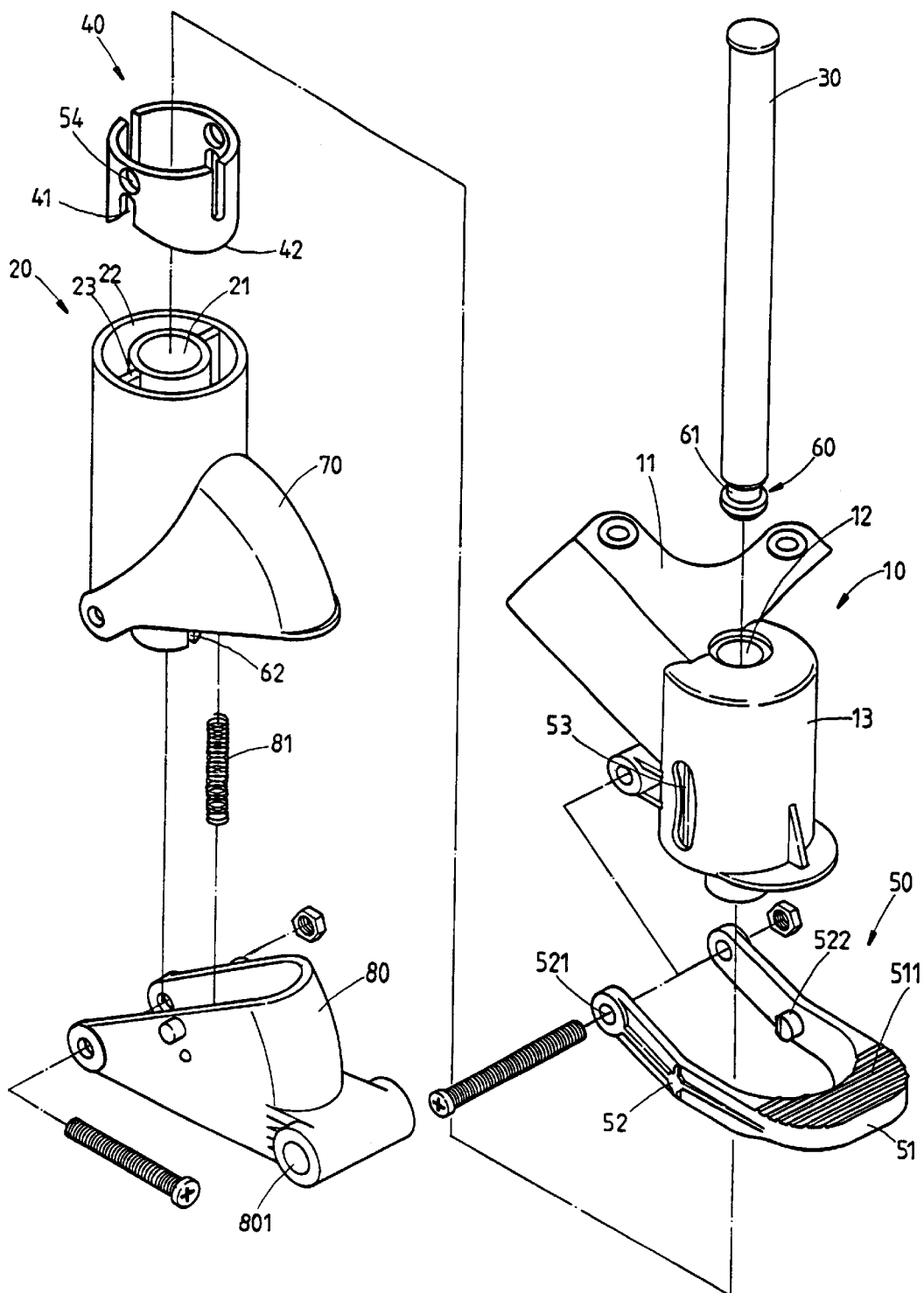
FIG. 1 is an analytic perspective view of the present invention.
Figure 2:
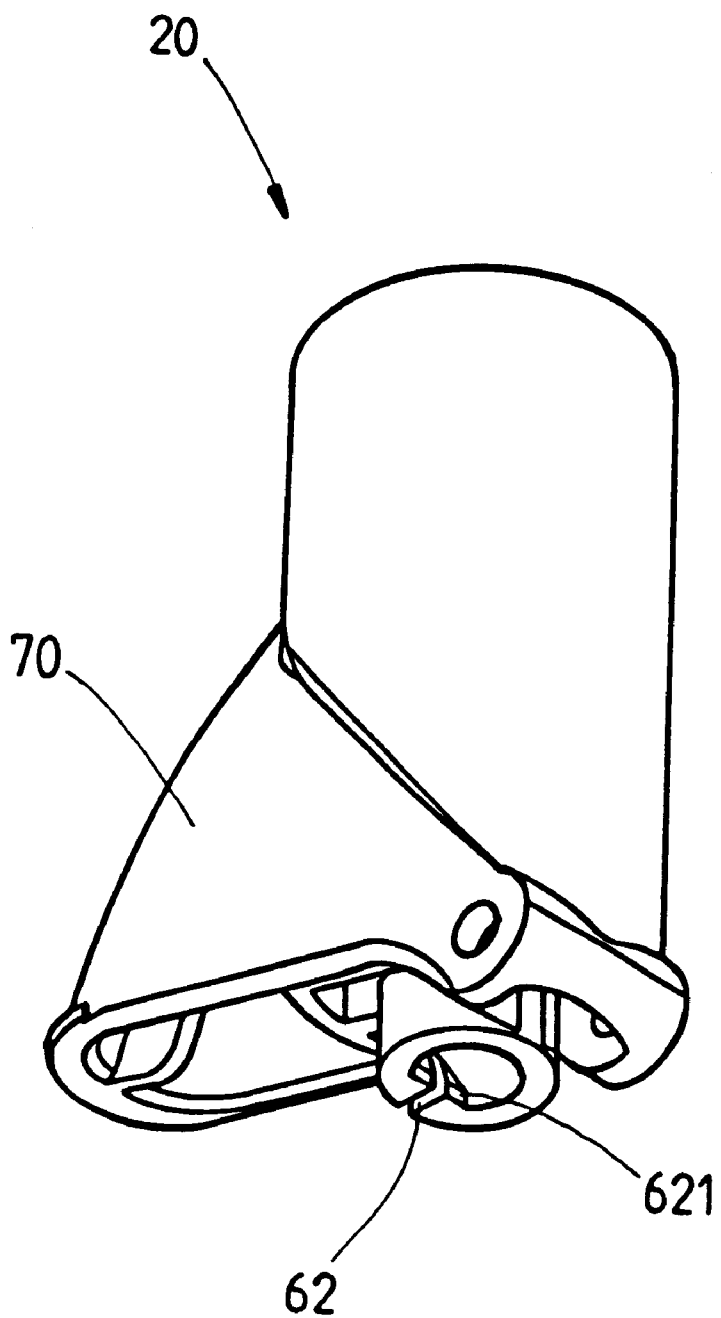
FIG. 2 is a perspective view showing a member of the present invention.
Figure 3:
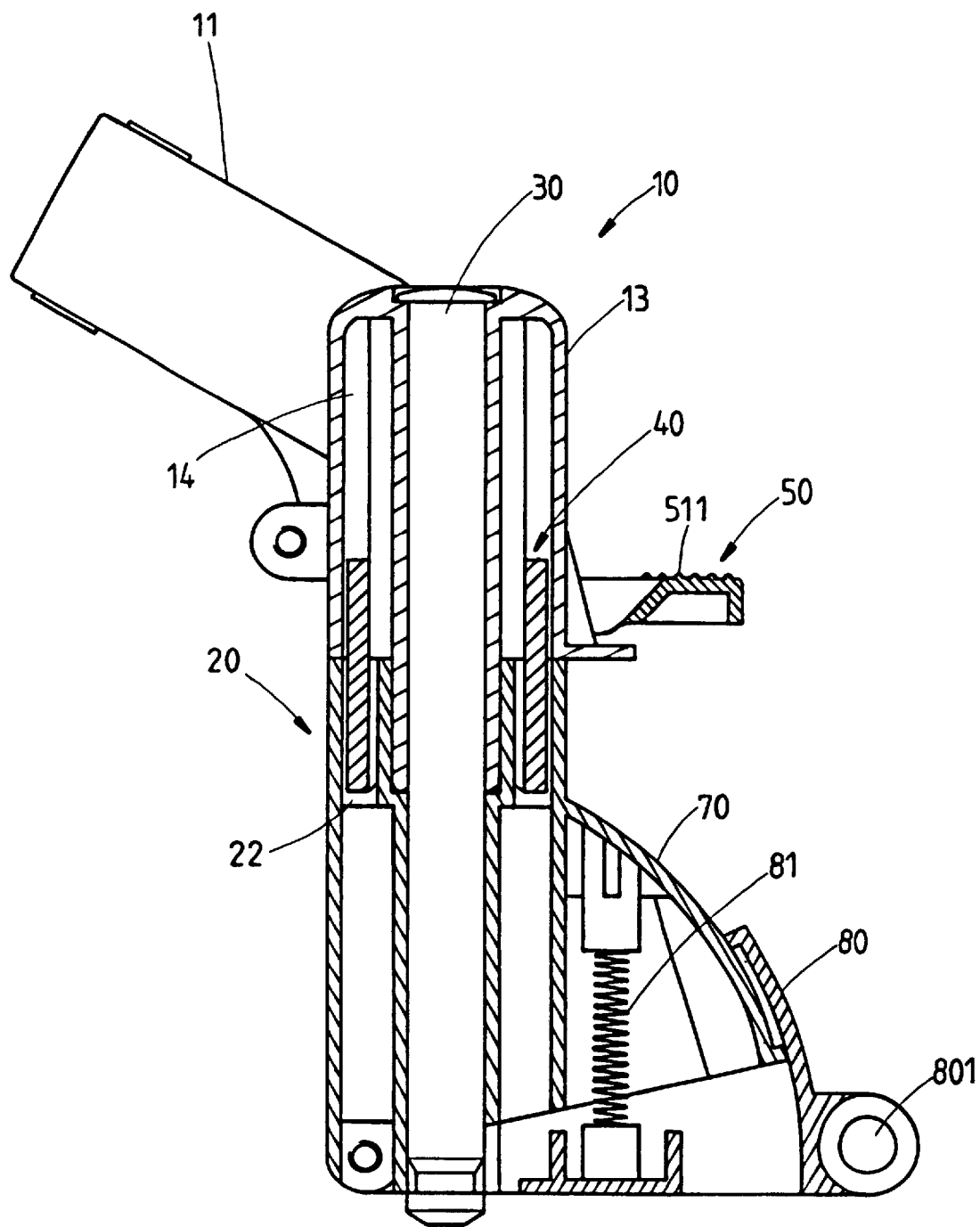
FIG. 3 is a sectional view of the present invention.

Referring to FIG. 1, 2 and 3, the structure of a wheel seat for a baby stroller of the present invention is comprised of an upper rotating seat 10, a lower rotating seat 20, a fixing pin 30, a direction-fixing slide sleeve 40 and an activating member 50.

The upper rotating seat 10 is provided on one end thereof with a connecting seat 11 for connecting to the frame of the baby stroller, the upper rotating seat 10 is generally in the shape of a cylinder with a hollow core 12, as is shown in FIG. 3, a first slide way 14 is formed between the hollow core 12 and the wall 13 of the cylinder.

The lower rotating seat 20 is also in the shape of a cylinder with a hollow core 21, a second slide way 22 is formed between the hollow core 21 and the wall of the cylinder cooperating with the first slide way 14 of the upper rotating seat 10 and includes at least a longitudinal blocking member 23. In the present embodiment, the second slide way 22 of the lower rotating seat 20 is provided with two longitudinal blocking members 23 arranged at two positions 180 degrees away from each other. Further, the lower rotating seat 20, the hollow core 21 and the longitudinal blocking members 23 are integrately formed.

The fixing pin 30 is extended through the hollow core 12 of the upper rotating seat 10 and the hollow core 21 of the lower rotating seat 20, and has an engaging portion 60 on the tailing end thereof for mutual rotatable engagement of the upper rotating seat 10 with the lower rotating seat 20.

The direction-fixing slide sleeve 40 is provided on the first slide way 14 of the upper rotating seat 10 and is slidable in the first slide way 14 and further is slidable in the second slide way 22 of the lower rotating seat 20, and is provided with two engaging slits 41 for engaging the longitudinal blocking members 23 of the lower rotating seat 20 to restrain the upper rotating seat 10 and the lower rotating seat 20 from rotation, the direction-fixing slide sleeve 40 is provided with a plurality of arciform portions 42 on the end having the engaging slits 41, in this embodiment, there are two arciform portions 42 symetrically allocated; the two engaging slits 41 are provided between the arciform portions 42, so that when the arciform portions 42 reach the blocking members 23, the upper rotating seat 10 moves slidedly relative to the lower rotating seat 20, and the two engaging slits 41 of the direction-fixing slide sleeve 40 can engage automatically the blocking members 23 of the lower rotating seat 20, and the effect of automatic direction fixing can be obtained.

The activating member 50 is provided with an activating knob 51 which is in the shape of "U" and is provided with two parallel limbs 52 having pivot holes 521 for pivotally connected to the upper rotating seat 10 which is provided with two longitudinal arciform guide slots 53, the direction-fixing slide sleeve 40 is provided corresponding in position to the longitudinal arciform guide slots 53 with two fixing holes 54, and the activating member 50 is provided corresponding in position to the longitudinal arciform guide slots 53 with two engaging pieces 522 which can be extended through the longitudinal arciform guide slots 53 into the fixing holes 54 provided on the direction-fixing slide sleeve 40. By pivotal moving of a transverse rod 511 provided on the activating knob 51, the direction-fixing slide sleeve 40 can slide in the first slide way 14 and in the second slide way 22 of the lower rotating seat 20.

The engaging portion 60 is used to fix the fixing pin 30 on the upper rotating seat 10 and the lower rotating seat 20, it is formed by forming a recessed neck 61 on the fixing pin 30, a slit 62 is formed on the end of the hollow core 21 of the lower rotating seat 20, and an engaging protuberance 621 is formed on the slit 62 protruding toward the hollow core 21, as shown in FIG. 2, in order that the engaging protuberance 621 is engaged with the recessed neck 61 on the fixing pin 30.

Moreover, to obtain an effect of buffering of the wheel seat, the lower rotating seat 20 is provided on the bottom thereof with a fixing seat 70 which is covered by a pivotable hood 80, a spring 81 is provided between the fixing seat 70 and the pivotable hood 80, so that the pivotable hood 80 has buffering effect. A fixing hole 801 is provided on the pivotable hood 80, one of the wheels 82 of the baby stroller is secured in the fixing hole 801, such as is shown in FIG. 4, in this way, the wheels 82 can have buffering effect in moving and vibrating up and down.

Figure 4:
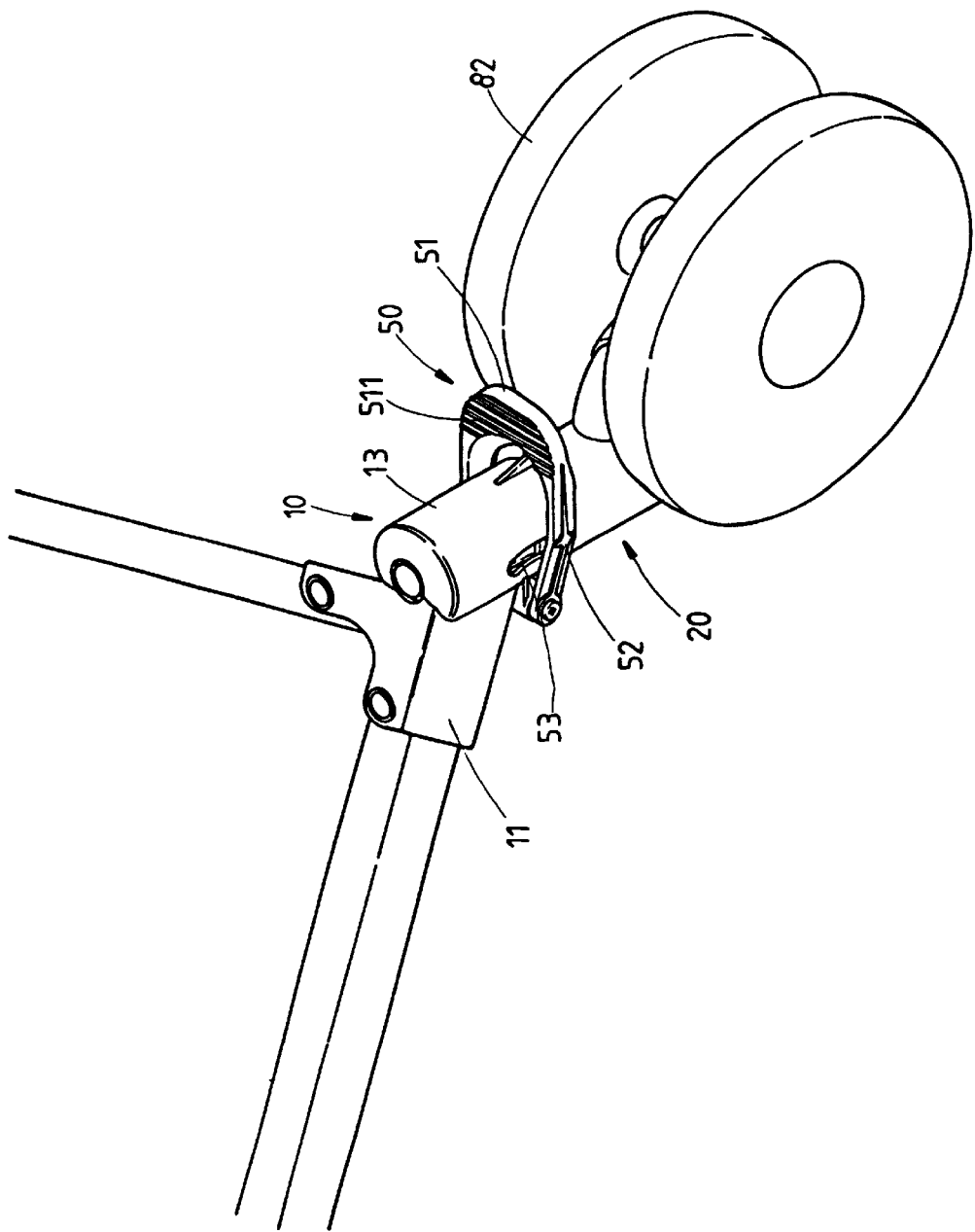
FIG. 4 shows an embodiment of the present invention.
Figure 5:
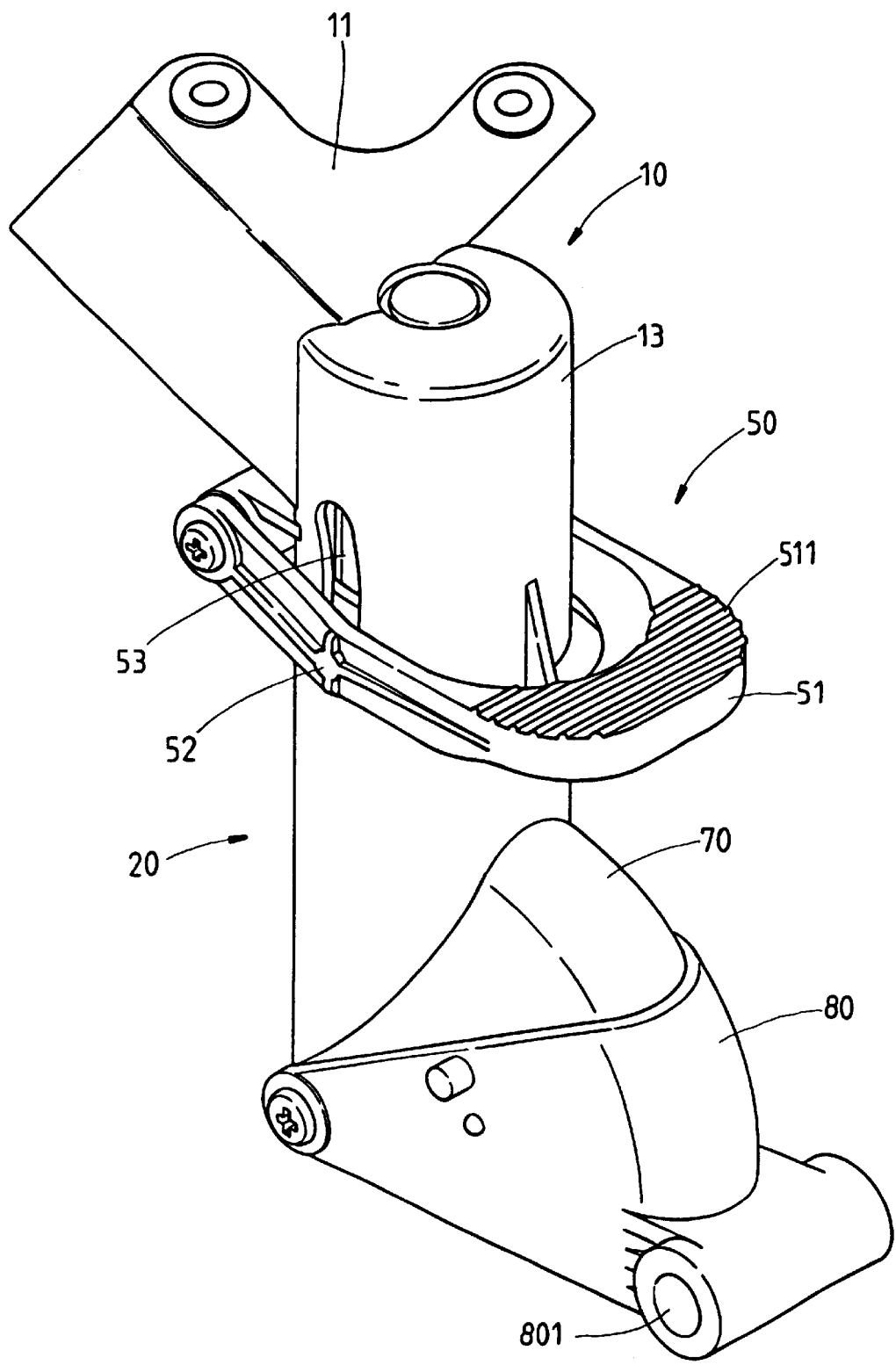
FIG. 5 is a perspective view showing assembling of the present invention.

Referring to FIG. 4 and 5, when the activating knob 51 of the activating member 50 is moved upwardly, the direction-fixing slide sleeve 40 of the upper rotating seat 10 is moved down into the lower rotating seat 20, so that the upper portion thereof is in the upper rotating seat 10, while the engaging slits 41 on the lower portion thereof are led to slip over the blocking members 23 of the lower rotating seat 20, thereby, the upper rotating seat 10 and the lower rotating seat 20 are restrained mutually from rotation, and thus the wheel seat automatically obtains the effect of direction fixing.

Figure 6:
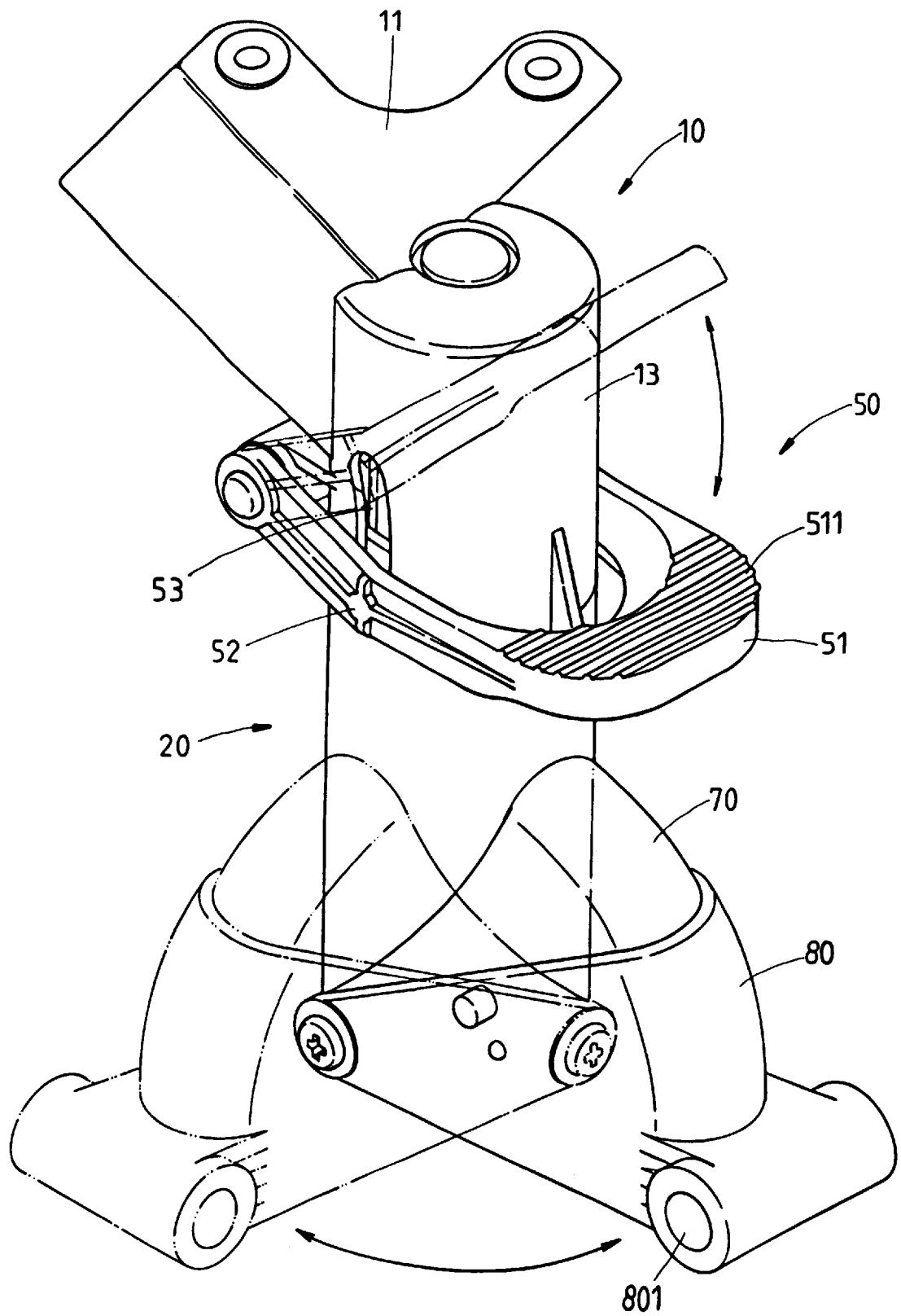
FIG. 6 is a schematic view of the present invention.

Please refer to FIG. 6, when the activating knob 51 of the activating member 50 is moved upwardly, the engaging slits 41 of the direction-fixing slide sleeve 40 gets rid of engagement of the blocking members 23 of the lower rotating seat 20, thereby, the wheel of the baby stroller can do rotatable direction changing in 360 degrees.

By the above stated combination of structure, the structure of a wheel seat for a baby stroller of the present invention can be certain to get the objects and functions of the present invention, and the wheel of the wheel seat of the baby stroller can do rotatable direction changing in 360 degrees, and the effect of direction fixing of the wheel can be obtained, in operation, the wheel seat for the baby stroller obtains automatically such direction fixing effect.

Obviously, many modifications and variations of the present invention are possible in the light of the above teachings. It is therefore to be understood that within the scope of the appended claims, the invention may be practised otherwise than what is specifically described in the preferred embodiment by those skilled in this art.

Having thus described my invention with practicability and improveness and in what manner the same is to be performed, what I claim as new and desire to be secured by Letters Patent of the United States are:

1. A structure of a wheel seat for a baby stroller comprising between the frame and a wheel of said baby stroller the following members:

an upper rotating seat connected on one end thereof to said frame of said baby stroller, being provided with a first slide way;

a lower rotating seat for securing a wheel on one end thereof and having a second slide way therein to cooperate with said first slide way of said upper rotating seat and including at least a longitudinal blocking member in said second slide way;

a fixing pin provided on said upper rotating seat and through said lower rotating seat and having an exposed engaging portion on the tailing end thereof for mutually rotatable engagement of said upper rotating seat with said lower rotating seat;

a direction-fixing slide sleeve provided on said first slide way of said upper rotating seat and slidable in said first slide way and further slidable in said second slide way of said lower rotating seat, being provided at least with an engaging slit for engaging said longitudinal blocking members of said lower rotating seat to restrain said upper rotating seat and said lower rotating seat from mutual rotation, said direction-fixing slide sleeve being provided with a plurality of arciform portions on the end having said engaging slits;

an activating member provided on said direction-fixing slide sleeve to make the latter slidable in said first slide way and in said second slide way.

2. A structure of a wheel seat for a baby stroller as stated in claim 1, wherein, said upper rotating seat is provided with a hollow core, said first slide way is formed between said upper rotating seat and said hollow core.

3. A structure of a wheel seat for a baby stroller as stated in claim 1, wherein, said lower rotating seat is also provided with a hollow core, said fixing pin is extended through said hollow core of said upper rotating seat and said hollow core of said lower rotating seat, so that said upper rotating seat and said lower rotating seat can effect mutual rotatable engagement.

4. A structure of a wheel seat for a baby stroller as stated in claim 3, wherein, said lower rotating seat is in the shape of a cylinder, said second slide way is formed between said hollow core and the wall of said cylinder.

5. A structure of a wheel seat for a baby stroller as stated in claim 4, wherein, said longitudinal blocking members of said lower rotating seat are provided between said hollow core and the wall of said cylinder.

6. A structure of a wheel seat for a baby stroller as stated in claim 5, wherein, said lower rotating seat is provided with two longitudinal blocking members arranged at two positions 180 degrees away from each other.

7. A structure of a wheel seat for a baby stroller as stated in claim 6, wherein, said lower rotating seat, said hollow core and said longitudinal blocking members are integrately formed.

8. A structure of a wheel seat for a baby stroller as stated in claim 6, wherein, said direction-fixing slide sleeve is in the shape of a cylinder and is provided in said first slide way of said upper rotating seat, and is provided with two engaging slits for engaging said longitudinal blocking members of said lower rotating seat, said direction-fixing slide sleeve is provided with a plurality of arciform portions on the end having said engaging slits.

9. A structure of a wheel seat for a baby stroller as stated in claim 1, wherein, said activating member is provided with an activating knob connecting with one end thereof to said upper rotating seat which is provided with two longitudinal arciform guide slots, said direction-fixing slide sleeve is provided corresponding in position to said longitudinal arciform guide slots with two fixing holes, and said activating member is provided corresponding in position to said longitudinal arciform guide slots with two engaging pieces which can be extended through said longitudinal arciform guide slots into said fixing holes provided on said direction-fixing slide sleeve, by pivotal moving of said activating knob, said direction-fixing slide sleeve can slide in said first slide way and said second slide way.

10. A structure of a wheel seat for a baby stroller as stated in claim 3, wherein, said engaging portion is formed by forming a recessed neck on said fixing pin, a slit is formed on the end of said hollow core of said lower rotating seat, and an engaging protuberance is formed on said slit protruding toward said hollow core, in order that said engaging protuberance is engaged with said recessed neck on said fixing pin.

* * * * *